United States Patent [19]

Evans

[11] 4,062,432

[45] Dec. 13, 1977

[54] FLUID COUPLINGS

[75] Inventor: Raymond Dennis Evans, Huddersfield, England

[73] Assignee: Holset Engineering Company Limited, Huddersfield, England

[21] Appl. No.: 709,236

[22] Filed: July 27, 1976

[30] Foreign Application Priority Data

July 30, 1975 United Kingdom ............... 31844/75

[51] Int. Cl.$^2$ ...................... F16D 35/00; F16D 43/25
[52] U.S. Cl. .................................. 192/58 B; 192/82 T
[58] Field of Search ........................... 192/58 B, 82 T

[56] References Cited

U.S. PATENT DOCUMENTS

| 3,262,528 | 7/1966 | Weir | 192/82 T |
|---|---|---|---|
| 3,893,555 | 7/1975 | Elmer | 192/58 B |
| 3,907,084 | 9/1975 | Hall | 192/82 T X |

Primary Examiner—Allan D. Herrmann
Attorney, Agent, or Firm—Gary M. Gron; Robert T. Ruff

[57] ABSTRACT

A valve for controlling flow of viscous fluid from a reservoir through a valve seat in a wall to a working chamber of a fluid coupling. Presence of fluid in the working chamber permits the drive to transmit torque in response to a single input variable, such as temperature. The valve comprises a valve arm pivotally mounted to the reservoir side of the wall and a closure member positioned on the working chamber side of the wall. The valve is biased to a position preventing flow except when a bimetallic temperature responsive element displaces the valve to an open position. The valve arm is shaped so that centrifugal force acting on it counteracts the centrifugal pressure force on the fluid in a direction opening the valve. The valve therefore is rendered insensitive to all variables except temperature.

7 Claims, 2 Drawing Figures

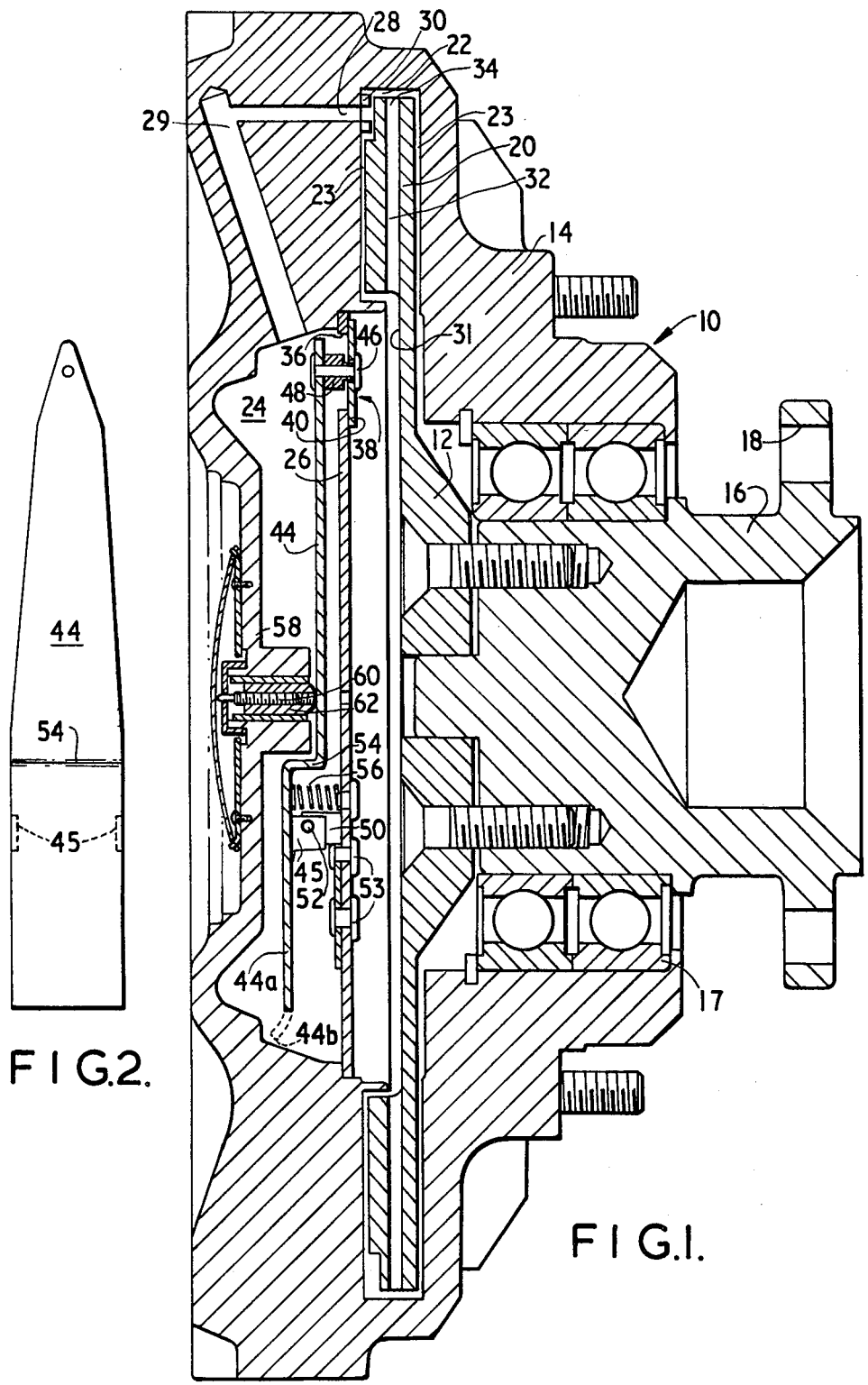

FLUID COUPLINGS

The present invention relates to a valve for use in a condition responsive fluid coupling, e.g., a fluid coupling for a fan drive, and to a fluid coupling containing such a valve.

Fluid couplings normally comprise a driving member and a driven member mounted for rotation relative to each other with at least a part of one of said members (usually the driving member) mounted within a drive chamber containing a viscous liquid and formed by at least a part of the other of said members. In operation, torque from the driving member is transmitted to the driven member by the shear resistance of the viscous liquid. In such systems it is sometimes desirable that the degree of torque transmitted is capable of variation in dependence upon a single controlling parameter, that the response of the driven member to changes in the controlling parameter is rapid and that the action of the coupling is smooth.

Couplings in which the degree of torque transmitted is variable in dependence upon a single controlling parameter (e.g. temperature) normally include a reservoir separate from the drive chamber, an inlet allowing fluid to pass from the drive chamber to the reservoir, an outlet for passage of fluid from the reservoir to the drive chamber and a valve in the outlet which valve may be opened and closed in response to variation in the desired parameter.

The present invention is concerned with a valve arrangement for this type of coupling, which is referred to hereinafter as a coupling of the type described, and also with a coupling including such a valve.

Previous valve mechanisms, such as those illustrated in British Pat. Nos. 1,005,831 and 817,021 have suffered from the disadvantage of being both temperature responsive and responsive to the rotational speed of the coupling devices they are intended to control because when the valve port is opened to permit fluid to flow from the reservoir to the drive chamber it is possible for the housing to accelerate. The elevated r.p.m. builds up a high enough pressure in the reservoir due to centrifugal force on the fluid to force the valve to the closed position before all fluid has been evacuated from the reservoir or before sufficient fluid has been passed into the drive chamber to create a centrifugal pressure balance. Closing of the valve in these conditions results in the fluid that has already passed to the drive chamber being returned to the reservoir with consequent reduction in housing speed. While the temperature remains high enough to permit the valve to re-open at the lower housing speed the cycle repeats automatically and the drive hunts and is unable to remain in the full drive condition. In order to obtain a fast response of the coupling to a rising temperature it is desirable to incorporate a large valve port. The use of a large valve port aggravates the hunting condition as the area of the valve closure member that is subject to centrifugal fluid pressure is increased and effectively causes the valve to close at a lower housing speed.

It is an object of the present invention to provide a valve in which the aforegoing disadvantages of the known valves are obviated.

According to the present invention there is provided a valve for a fluid coupling of the type described, comprising a valve plate located in the wall separating the fluid reservoir from the drive chamber and including a valve port surrounded by a valve seat, and a closure member movable, in response to a single variable parameter external to the coupling, between a closed position in which the closure member seats against the valve seat and an open position in which the closure member is spaced from the valve seat in a direction away from the fluid reservoir.

The invention also provides a coupling of the type described having such a valve.

In a preferred embodiment, the closure member is mounted on the free end of a valve arm pivotally mounted on the valve plate, the pivotal mounting being located on the fluid reservoir side of the valve plate and the closure member being located on the drive chamber side of the valve plate, the closure member being biassed towards the valve seat by spring means, and the geometry of the valve arm and the pivoted mounting being so arranged that, in addition to the closing force exerted by said spring means on the closure member, centrifugal force generated upon rotation of the coupling acts to apply a turning moment on the valve arm urging the closure member towards the valve seat and opposing the effect of the centrifugal pressure force tending to open the valve, thus rendering the valve insensitive to the rotational speed of the coupling.

Preferably the valve is provided with means for altering the point of response to the single variable parameter.

The coupling may be of the type in which the fluid passes through the valve directly from the reservoir to the drive chamber (as in British patent specification No. 1,005,831) or may be of the type described in copending application No. 7168/73 which comprises a rotatable driving member, at least part of which is mounted for co-axial rotation within a working chamber forming part of a rotatable driven member, shear spaces defined by opposing faces of said driving member and working chamber, a reservoir forming part of the driven member, at least one inlet port adjacent the periphery of the driven member and connecting the working chamber with the reservoir, at least one outlet port located radially inwardly of the inlet port or ports, fluid transfer duct means extending axially between the outlet port or ports and one or more flow accelerating passages within that part of the driving member located within the working chamber, each said fluid flow accelerating passage being open at each end and extending from a point immediately radially outwardly of the outlet port or ports to the periphery of the driving member, the periphery of the driving member being at a greater radial distance from the coaxial centers of the driving and driven members than said inlet port, and a valve member being movable to open or close the outlet port or ports and control the flow of fluid from the reservoir to the shear spaces via the said transfer duct and fluid flow accelerating passages.

Couplings of the latter type are further described in U.S. Pat. No. 3,905,084, the disclosure of which is incorporated herein by reference.

The invention is described further hereinafter, by way of example, with reference to the accompanying drawings in which:

FIG. 1 is a diagrammatic cross-sectional view of a fluid coupling incorporating a valve in accordance with the present invention; and FIG. 2 is a front elevation of the part of the valve of FIG. 1 which carries the valve closure member.

Referring to FIGS. 1 and 2 there is shown a fluid coupling indicated generally as 10, containing a viscous working fluid (not shown) and comprising a driving member 12 and a driven member 14 mounted for rotation relative to the driving member 12. The driving member 12 includes a flanged boss 16 for connection via bolt holes 18 to a source of rotational energy (not shown), the driven member being rotatably mounted on the boss 16 by means of a bearing assembly 17. A drive disc 20 which forms part of the driving member 12 is enclosed within a working chamber 22 defined by the driven member 14, shear spaces 23 being defined by opposing faces of the working chamber 22 and the drive disc 20. Working chamber 22 is separated from a reservoir 24, also defined by the driven member 14, by a wall 26. An inlet port 28 located in the driven member 14 adjacent the periphery of the drive disc 20 is connected to the reservoir 24 by a passageway 29. A scoop 30 is provided adjacent the inlet 28. The central portion of the drive disc 20 is dished at 31 and a series of flow acceleration passages 32, formed in the drive disc 20, extend from the dished central region 31 of the drive disc 20 to the periphery of the drive disc 20. The flow accelerating passages 32 terminate in orifices 34 formed in the peripheral edge of the drive disc 20. An outlet port 36 is provided in the wall 26.

A valve member, indicated generally as 38, is provided to control the flow fluid through outlet port 36 and comprises a valve seat 40 formed on the opposite side of the wall 26 to the reservoir 24, and a valve closure member 42 mounted on one end of a valve arm 44 by means of a rivet 46 and a spacer 48. The arm 44 includes a pair of lugs 45 by which it is pivotally mounted at 52 on a bracket 50 connected to the reservoir side of the wall 26 by means of rivets 53, the pivotal axis being parallel to the plane containing the outlet port 36 whereby opening and closing of the valve 38 can be effected by pivoting of the valve arm 44. The arm 44 has a step therein at a location indicated by the reference numeral 54. Between the stepped portion 54 of the member 44 and the location of the lugs 45, there is located a helical coil spring 56, one end of which engages the wall 26 and the other engages the arm 44 such as to bias the arm 44 anti-clockwise as viewed in FIG. 1 and hence to urge the valve closure member 42 into its closed position in engagement with the valve seat 40. Said one end of the spring 56 is located on the wall 26 by the head of a rivet 55. It will be noted that the construction is such that the centrifugal force generated upon rotation of the assembly results in an anti-clockwise turning moment on the valve arm 44 tending therefore to close the valve. The latter action therefore assists the biassing force of the spring 56.

A bimetallic thermostat is mounted on the driven part 14 and includes a bimetallic plate 58 which is operably connectable to the pivoted valve arm 44 carrying the valve closure member by an adjustable rod consisting of a screw 60 and nut 62. The thermostat 58 is arranged with its higher expansion side nearest the arm 44.

In operation, the drive member 12 is rotated by the means not shown and by virtue of the shear resistance of the viscous fluid in the working chamber 22 the driven chamber begins to rotate. As a result of the difference in speed between the drive disc 20 and the driven member 14 viscous fluid within the working chamber 22 is gathered by the scoop 30 and passes through the inlet port 28 to the reservoir 24. The strength of the spring 56 is so chosen that when the coupling is at rest and the temperature externally of the coupling is below a predetermined limit, the valve arm 44 is deflected to the left, as viewed in FIG. 1, to preload both the valve closure member 42 in its closed position on the valve seat 40 and the adjustable rod 60, 62 against the bimetallic plate 58 of the thermostat. The proportion of the preload carried by either the bimetallic thermostat or the valve seat may be varied by adjusting the length of the adjustable rod 60, 62.

When the temperature externally of the coupling rises above the predetermined limit the bimetallic plate 58 of the thermostat deflects to the right, as viewed in FIG. 1, moving the adjustable rod 60, 62 and the valve arm 44 to the right to unseat the valve closure member 42 from the valve seat 40 and hold the valve in a position in which the outlet port 36 is open. On rotation of the coupling, fluid from the reservoir 24 therefore passes through the outlet port 36 into the flow accelerating passages 32 in the disc 20, through the orifices 34 and back into the working chamber 22. An equilibrium flow is thus achieved from the reservoir 24 through the outlet port 36 and the transfer passages 32 into the working chamber 22 and back into the reservoir 24.

When the coupling is in this condition, the driven member 14 rotates at a maximum speed and the centrifugal pressure of the fluid in the reservoir is at a maximum and fluid flowing through the outlet port 36 provides a positive force in the valve opening direction. When large valve port areas are selected to assist in rapid filling of the working chamber with the working fluid, the force exerted by the working fluid on the valve closure member 42 in the valve opening direction at high rotational speeds may be greater than the force exerted by the spring 56 in the valve closing direction thus preventing the valve from closing upon a reduction in temperature externally of the coupling.

The geometry of the valve arm and pivoted mounting are so arranged that the centrifugal force generated by rotation of the coupling creates a turning moment on the valve arm 44 tending to rotate the valve arm 44 about the pivoted mounting in the valve closing direction. At high rotational speeds of the coupling this turning moment balances the force provided by the working fluid in the valve opening direction. The operation of the valve is thus rendered insensitive to any forces created by rotation of the coupling and is only dependent upon the forces generated by variations in the temperature of the bimetallic thermostat.

When the temperature externally of the coupling drops below the predetermined limit, the bimetallic plate 58 of the thermostat deflects to the left as viewed in FIG. 1 such that the rod member 60, 62 permits the valve arm 44 to pivot anti-clockwise thus closing the valve 38 and preventing further flow of fluid from the reservoir 24 to the flow accelerating passages 32 and thus to the working chamber 22. The scoop 30 however continues to direct fluid from the working chamber 22 through the inlet port 28 into the reservoir 24 and the amount of fluid in the working chamber 22 is thereby reduced, thus decreasing the amount of fluid in the shear spaces between the drive disc 20 and the driven member 14 and hence the degree of drive between the drive disc 20 and the driven member 14. The driven member 14 begins to slow down until it is substantially free-wheeling round the drive disc 20 with very little drive being transmitted from the drive disc 20 to the driven member 14. At this point in the operating cycle of the coupling, the driven member 14 is rotating at its minimum speed and hence the centrifugal force exerted on the valve arm 44 and the closure member 42 is also at a minimum.

When the temperature again rises above the predetermined limit, the bimetallic thermostat moves the rod member 60, 62 to the right as viewed in FIG. 1 thereby pivoting the valve arm 44 to open the valve 38 and allow fluid to pass once more from to the reservoir 24 through the outlet port 36 and flow accelerating passages 32 into the working chamber 22. Until the valve 38 has actually opened and admitted fluid into the working chamber 22 to allow the speed of the driven member to build up, the centrifugal force on the valve arm 44 and closure member 42 is at a minimum value and provides little or negligible force to hold the valve 38 in the closed position and hence the force to be overcome by the bimetal thermostat is little more than that exerted by the spring 56.

It can be seen that the passage of fluid through the outlet 36 from the reservoir tends to open the valve 38 rather than close it as in prior art constructions. The amount of fluid in the working chamber is gradually increased from the periphery until the shear spaces are filled and equilibrium is again reached. During this time the speed of the driven member increases due to the increasing area of driving and driven member in shear.

The bimetallic thermostat may be replaced by any other suitable form of temperature sensing device or by an arrangement to sense another parameter desired.

As illustrated in FIG. 1, the pivoted valve arm 44 carrying the closure member 42 can have a tail portion 44a on the opposite side of the pivotal axis 52 to the closure member 42. The length of this tail portion 44a can be chosen to achieve a desired centrifugal effect on the arm 44 as a whole but in some embodiments may not be necessary at all. In other embodiments it can have a curved tip portion 44b designed to engage the body of the driven member 14 at a predetermined pivoting angle of the arm 44 to thereby limit the degree of opening of the valve 38.

I claim:

1. A fluid coupling comprising:

a driving member and a driven member mounted for rotation relative to one another;

means forming a drive chamber receiving one of said members and formed by at least a part of the other of said members.

means forming a reservoir separate from said drive chamber, means forming a passage from said drive chamber to said reservoir, means forming an outlet port from said reservoir to said drive chamber, a viscous liquid contained within said reservoir, said liquid being adapted to pass through said port to said drive chamber for transmitting torque between said members and pass through said passage to said reservoir;

a valve arm pivotally mounted on one of said members and having a closure member at one end thereof, said valve arm being displaceable between a closed position in which the closure member seats against said port to prevent flow of liquid into said drive chamber and an open position in which the closure member is spaced from said port in the direction of liquid flow from said reservoir, means for yieldably biasing said valve arm toward said closed position;

means for displacing said valve arm toward said open position in response to a single variable parameter external to the coupling;

the geometry of the valve arm and the pivotal mounting thereof being so arranged that centrifugal force generated upon rotation of the coupling acts to apply a turning moment on the valve arm urging it toward the closed position in opposition to the centrifugally created pressure force of liquid acting to urge the valve arm toward the open position;

whereby the operation of said valve is rendered insensitive to the R.P.M. of said coupling.

2. A fluid coupling as in claim 1 wherein:

said coupling includes a plate separating said reservoir from said drive chamber, said port being formed through said plate, said valve arm is pivotally mounted to said plate on the reservoir side thereof; and said closure member is positioned on the drive chamber side of said plate.

3. A fluid coupling according to claim 2 including a rigid coupling linkage connecting the free end of the valve arm to the closure member, the rigid coupling linkage extending through said port.

4. A fluid coupling according to claim 2 in which the yielding means comprises a helical coil spring located between the reservoir side of the plate and the adjacent side of the valve arm.

5. A fluid coupling according to claim 4 wherein said valve arm displacement means comprises a bimetallic thermostat mounted on the driven member and having a rod which is longitudinally displaceable in dependence upon the deflection of a temperature sensitive element, the rod being engageable with that side of the valve arm remote from the helical coil spring.

6. A fluid coupling according to claim 5 in which the helical coil spring engages the valve arm at a longitudinal position between the pivotal mounting point of the valve arm on the valve plate and the location on the valve arm engaged by the rod of the thermostat.

7. A fluid coupling according to claim 2 in which the valve arm has a portion which extends beyond the pivotal mounting point in a direction away from the closure member and which serves as a stop for engaging the body of the driven member to limit the degree of opening of the valve.

* * * * *